March 25, 1930.  R. M. LIKE  1,751,702
CONTINUOUS PROJECTOR
Filed Nov. 9, 1926  2 Sheets-Sheet 1

INVENTOR.
RALPH M. LIKE
BY Nestall and Wallace
ATTORNEYS.

March 25, 1930.    R. M. LIKE    1,751,702
CONTINUOUS PROJECTOR
Filed Nov. 9, 1926    2 Sheets-Sheet 2
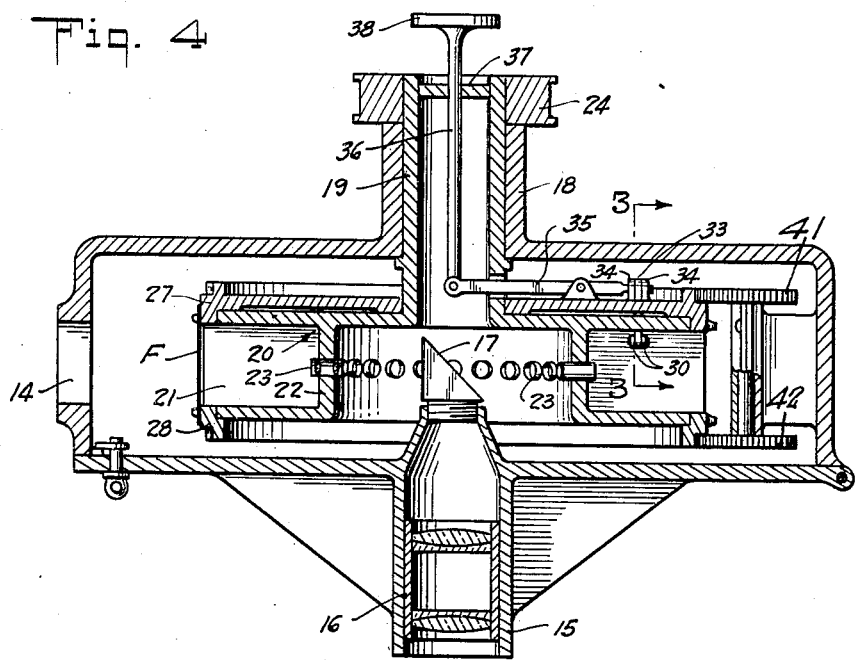
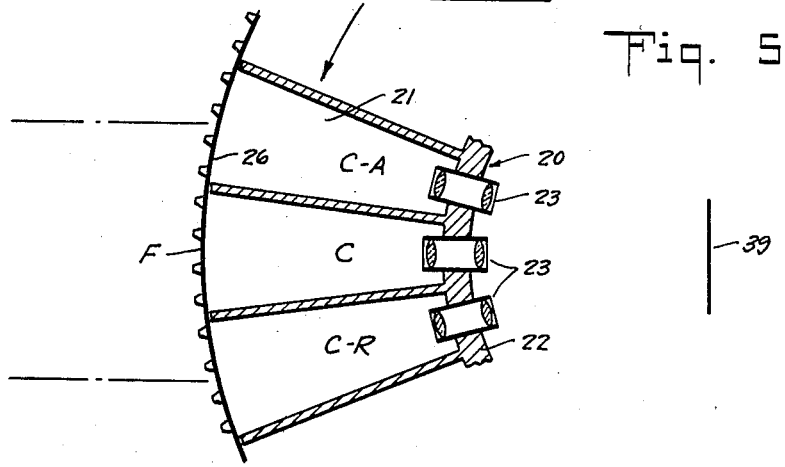
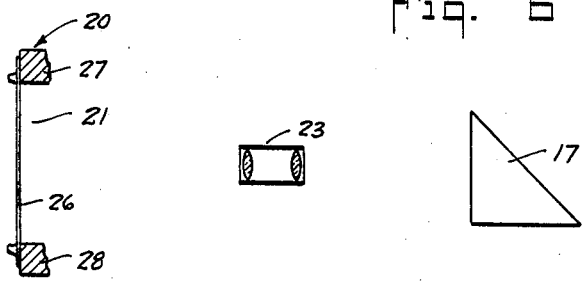
INVENTOR.
RALPH M. LIKE
BY *Nostall and Wallace*
ATTORNEYS.

Patented Mar. 25, 1930

1,751,702

UNITED STATES PATENT OFFICE

RALPH M. LIKE, OF LOS ANGELES, CALIFORNIA, ASSIGNOR TO FRANK E. CARTER, OF BRAWLEY, CALIFORNIA

CONTINUOUS PROJECTOR

Application filed November 9, 1926. Serial No. 147,225.

This invention relates to motion picture projection wherein the pictures are continuously projected instead of intermittently. The present practice in projecting motion pictures is to project a picture, maintaining the projected image stationary by holding the film stationary, then occluding the light so as to darken the screen, replace the frame of the film with the succeeding one in the film, projecting the image of this frame and repeating the operation. Thus, there is an intermittent projection of pictures progressively changing. The screen upon which the pictures are projected is dark for a very appreciable portion of the entire time the motion picture is being shown. In contradistinction to this method, the present invention relates to a means of projecting a motion picture and gradually replacing it with the next frame by increasing the intensity of light of the succeeding frame and decreasing the intensity of light of the preceding frame. This invention has for its primary object the provision of means for projecting pictures in the manner before described.

Figure 1:
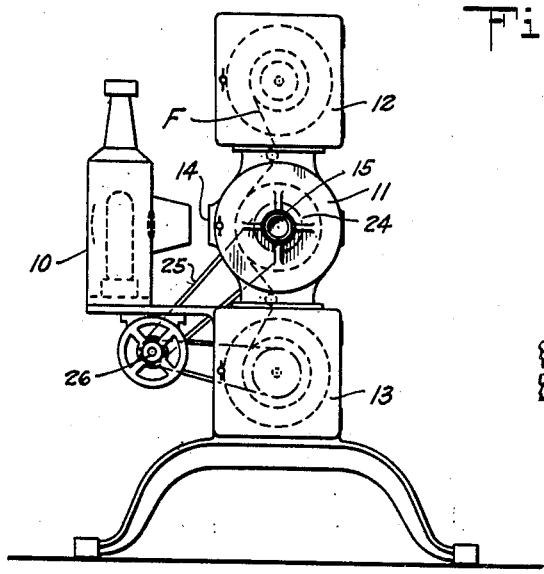
Figure 3:
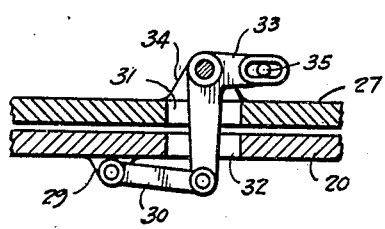
Figure 2:
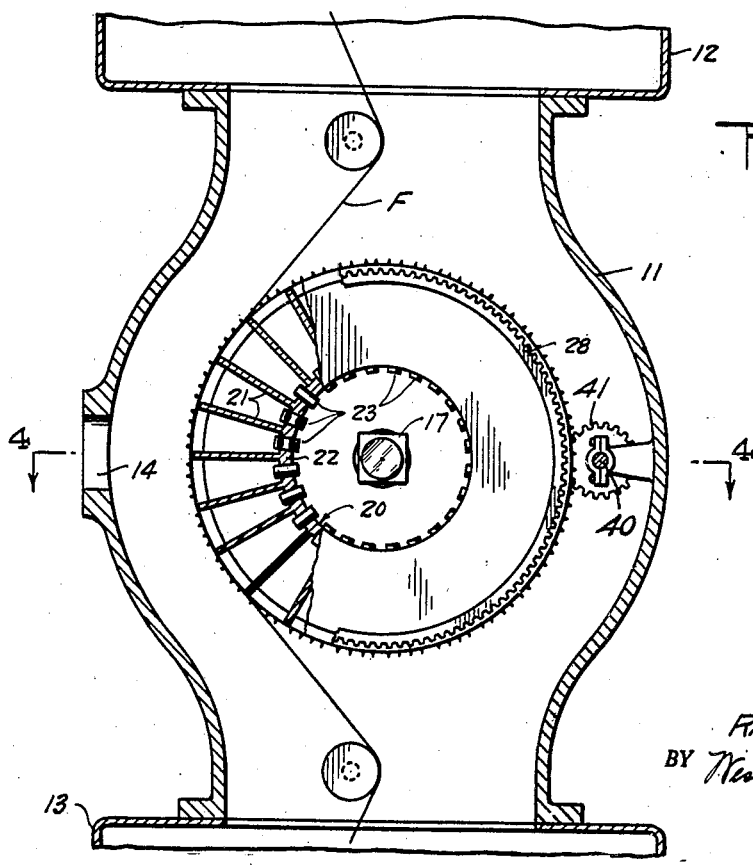

These objects together with other objects and corresponding accomplishments, are obtained by means of the device illustrated in the accompanying drawings in which:
Fig. 1 is a side elevation of a complete machine; Fig. 2 is a vertical section therethrough showing a fragment of the machine; Fig. 3 is a section as seen on the line 3—3 of Fig. 4 showing a fragmentary detail of the film adjusting means; Fig. 4 is a section seen on the line 4—4 of Fig. 2; Fig. 5 is a diagrammatic view showing a fragment of the film carrier; and Fig. 6 is a diagrammatic view showing the relation of the film, objective and prism.

Referring with more particularity to Fig. 1 of the drawing, a light box is indicated by 10. This box is of a character well known in the art and projects a beam of light from a lamp into the projection compartment indicated generally by 11. A magazine for film is indicated by 12 and a take-up box by 13. There is a suitable gearing for operating the take-up reel such as a belt and pulley. The invention resides particularly in the projection mechanism. The projection chamber comprises a casing having an opening 14 at one side in registration with the opening in the light box to admit the beam of light into the projection compartment. At the center of the projection compartment is a tubular extension 15 having mounted therein an objective 16. Supported in line with the axis of the objective is a prism 17 for directing the light rays through the objective.

Opposite to the tubular extension 15 is a tubular extension 18, within which is journalled a hollow shaft 19 secured to the film carrier body 20. This film carrier body is cylindrical in form having a number of radially extending cells 21. There are suitable partitions to form the cells, and they end in a cylindrical wall 22 so that the cells are arranged in the form of a ring with a single light receiving chamber at the center for all cells. On the outer surface, the cells are open and there are apertures in the wall 22 at each cell, there being a condenser 23 mounted in each aperture.

The film indicated by F and best shown in Figures 1 and 2 is rove through the projection compartment from the reel in the magazine box 12 to the reel in the take-up box 13. It is passed around the periphery of the film carrier covering a portion of the periphery adjacent to the opening 14 in the projection chamber. The film is continuously advanced, and this is effected by rotating the carrier. For the purpose of rotating the carrier there is a pulley 24. This pulley is geared by a belt 25 to a pulley on a driving shaft indicated by 26. The carrier body has mounted thereon a film engaging member comprising a gear 27 and a gear ring 28 so that the film may be positioned on the carrier body. To this end the gear and ring are rotatively mounted on the body, there being a disc portion of gear 27 resting against the disc portion of the film carrier and a ring 28 upon the body of the carrier. The ring and gear are interconnected so as to be moved together by means of a shaft 40 journalled on the casing and having pinions 41 and 42 meshing respectively with gear 27 and a ring 28. There are teeth extending from the rings and arranged so as to engage the perforations in the film. A frame of film should be exactly positioned over a cell, the distance between centers of cells being equal to the length of a frame of film. In order to properly position the film, the rings may be turned upon the carrier body to bring the frame of film into proper registration with a cell. Mounted upon the inside of the film carrier disc, is a bracket 29, to which is pivotally secured a link 30. There are registering openings 31 and 32 in the disc of ring 27 and the body 20 of the carrier to accommodate the passage of one arm of a bell crank lever 33. Bell crank lever 33 is pivotally mounted upon a bracket 34 on disc 27. The bell crank lever 33 has an arm 35 pivotally mounted upon the disc 17 by means of a bracket so that upon swinging the outer end of the link 35, the bell crank lever will be swung and the ring moved a limited distance upon the carrier. The lever 35 is swung by means of a rod 36 which is slidably mounted in a disc 37 and having a head 38 at the end thereof projecting beyond the shaft 19. Obviously by moving the head 38 inwardly or outwardly, the ring 26 may be angularly adjusted to correctly position the film.

Assuming that the film has been correctly positioned, light is projected from the light box 10, and the film carrier is rotated. Referring more particularly to Figures 5 and 6, a beam of light will be projected through a central cell, in line with the opening 14, the image from the film being projected through the lenses 23 to the central chamber so as to strike the reflecting surface of the prism. In Fig. 5 the reflecting surface has been indicated by a plane 39 instead of the prism, the view being diagrammatic. The most intense portion of the beam of light is at the center, and the intensity decreases toward the edges. In the present instance, the outer edges of the beam also pass through a section of film over the receding cell C—R, and the advancing cell C—A. The image on the frame over cell C—A will be projected upon the reflecting surface 39 and also the image from the receding cell C—R. All of these images will not be registered; however, the images will not be identical. The image from the cell C will be the most intense, and will be the one which affects the eye. The cell C will move into the receding cell position, the image projected gradually decreasing in intensity, while the image from the advancing cell C—A, will move into the center of the light beam, causing an increase in intensity of its image to replace the preceding image. This action continues progressively, there being a gradual change of images, the light being projected continuously. The images on the reflecting surface will be directed through the objective 16 upon the screen. It is not essential that the light beam extend over adjacent cells. If the light beam field was sufficient to cover only a single cell, there would be times at which complementary portions of two images would be projected upon the screen in registration, one complementary part replacing the other.

Obviously, the present invention is applicable to cameras. By a reversal of operation and doing away with the light box and other changes within the purview of those skilled in the art, the invention may be embodied in a camera.

What I claim is:

1. A projector for motion picture film comprising a light means having an aperture for projecting a light beam, an arcuate film carrier mounted to travel in a continuous cycle past the beam from said light means, said carrier having radial cells for the passage of a beam of light therethrough and means to peripherally hold a film with frames thereof across said cells and to travel with the film thereover, one frame of a film being disposed across a cell whereby to project an image therefrom inwardly through a cell, image receiving means at the center of the arc of said carrier to receive images projected through said film, said aperture being of such dimensions as to at all times project light through a plurality of adjacent cells whereby to maintain the projected image in stationary position while the cell is traveling and to replace in complementary registration the image from the succeeding frame while it is moving into the field of said beam of light and while the preceding image is being withdrawn.

2. A projector for motion picture film comprising light means with an aperture to project a beam of light, a film carrier arranged to be rotated having radially disposed cells for the passage of light from said aperture and a single central light receiving chamber for all of said cells, the outer surface of said carrier being cylindrical and having means to engage film and pass along therewith in its advance, a frame of film being arranged to cover a cell, said light means being disposed to project a beam radially inward through a cell to the central chamber and of such dimensions as to at all times project light through a plurality of contiguous cells, a light reflector at the center of said chamber disposed to receive the projected images and direct them axially with relation to said carrier, and an objective lens system associated therewith.

3. A projector for motion picture film comprising light means with an aperture to project a beam of light, a film carrier arranged to be rotated having radially disposed cells for the passage of light from said aperture and a single central light receiving chamber for all of said cells, the outer surface of said carrier being cylindrical and having means to engage film and pass along therewith in its advance, a frame of film being arranged to cover a cell, said light means being disposed to project a beam radially inward through a cell to the central chamber and of such dimensions as to at all times project light through a plurality of contiguous cells, a light reflector at the center of said chamber disposed to receive the projected images and direct them axially with relation to said carrier, and an objective lens system associated therewith.

4. A projector for motion picture film comprising a light box with an aperture to project a beam of light, a film carrier mounted to be rotated having radially disposed cells for the passage of light from said aperture and a single central light receiving chamber for all of said cells, the outer surface of said carrier being cylindrical and including means to engage film and pass along therewith in its advance, a frame of film covering a cell, said light box being disposed to project at all times a beam inwardly through a plurality of cells to the central chamber, a prism at the center of said chamber for receiving images from cells and reflecting them axially with relation to said carrier, a tube through which the reflected images are projected and an objective in said tube.

5. A projector for motion picture film comprising light means having an aperture to project a beam of light, a film carrier mounted to be rotated having radially disposed cells for the passage of light from said aperture and a single central light receiving chamber for all of said cells, the outer surface of said carrier being cylindrical and having film adjusting means rotatively mounted thereon to engage film and pass along therewith in its advance, the cells being of dimensions such that a frame of film covers a cell, said light means being disposed to project at all times a beam through a plurality of contiguous cells to the central chamber, a light reflector at the center of said chamber arranged to receive the projected images and direct them axially with relation to said carrier, a lens system associated therewith, and means on said carrier to actuate said adjusting means to position and adjust the film thereon with relation to said cells.

6. A projector for motion picture film comprising a light box having an aperture to project a beam of light, a film carrier mounted to be rotated having radially arranged cells for the passage of light and a single central light receiving chamber for all of said cells, the outer surface of said carrier being cylindrical and having film engaging means rotatively mounted thereon to cause film to pass along therewith in its advance, a frame of film covering a single cell, said light box being disposed to project at all times a beam through a plurality of contiguous cells to the central chamber, a prism at the center of said chamber for receiving images projected through said cells and reflecting them axially with relation to said carrier, a tube through which the reflected images are projected, an objective in said tube, and means on said carrier to actuate said film engaging means and to position and adjust the film thereon with relation to said cells.

In witness that I claim the foregoing I have hereunto subscribed my name this 28th day of September, 1926.

RALPH M. LIKE.